(12) United States Patent
Cheng-Yuan et al.

(10) Patent No.: US 8,061,535 B2
(45) Date of Patent: Nov. 22, 2011

(54) COMBINATION DEVICES CLAMP SPRING DESIGNED WITH DEVICES CAGE

(75) Inventors: Fan Cheng-Yuan, Wugu Township, Taipei County (TW); Sam Chin, Banciao (TW)

(73) Assignee: Flextronics AP, LLC, Broomfield, CO (US)

( * ) Notice: Subject to any disclaimer, the term of this patent is extended or adjusted under 35 U.S.C. 154(b) by 600 days.

(21) Appl. No.: 12/079,690

(22) Filed: Mar. 28, 2008

(65) Prior Publication Data

US 2008/0237156 A1 Oct. 2, 2008

Related U.S. Application Data

(60) Provisional application No. 60/921,220, filed on Mar. 29, 2007.

(51) Int. Cl.
*A47F 7/00* (2006.01)

(52) U.S. Cl. ............ 211/26; 361/679.34; 361/679.35; 312/223.2

(58) Field of Classification Search .......... 211/26; 361/679.02, 679.31, 679.33, 679.34, 679.35, 361/679.37, 679.39; 312/223.1, 223.2
See application file for complete search history.

(56) References Cited

U.S. PATENT DOCUMENTS

| | | | |
|---|---|---|---|
| 4,476,606 A * | 10/1984 | Bjorkman et al. | 15/268 |
| 5,682,291 A | 10/1997 | Jeffries et al. | |
| 5,946,061 A | 8/1999 | Kurihara et al. | |
| 6,002,658 A | 12/1999 | Aso et al. | |
| 6,151,207 A | 11/2000 | Kim | |
| 6,310,769 B1 | 10/2001 | Johnson et al. | 361/683 |
| 6,377,447 B1 | 4/2002 | Boe | |
| 6,377,449 B1 | 4/2002 | Liao et al. | |
| 6,411,501 B1 | 6/2002 | Cho et al. | |
| 6,501,641 B1 | 12/2002 | Kim et al. | |
| 6,560,092 B2 | 5/2003 | Itou et al. | |
| 6,590,848 B1 | 7/2003 | Chen | |
| 6,614,654 B2 | 9/2003 | Liu et al. | |
| 6,619,766 B1 | 9/2003 | Mansueto | |
| 6,661,652 B2 | 12/2003 | Worden et al. | |
| 6,728,109 B1 * | 4/2004 | Wu | 361/747 |
| 6,813,148 B2 | 11/2004 | Hsu et al. | |
| 6,813,159 B2 | 11/2004 | Irie et al. | |
| 6,859,357 B2 | 2/2005 | Morimoto et al. | |

(Continued)

OTHER PUBLICATIONS

Reply as filed on Mar. 22, 2010, to the office action dated Jan. 6, 2010.
U.S. Appl. No. 12/124,301, filed May 21, 2008, applicants: Fan, Cheng-Yuan et al., 14 pages.

(Continued)

*Primary Examiner* — Korie Chan
(74) *Attorney, Agent, or Firm* — Haverstock & Owens LLP

(57) ABSTRACT

A devices cage comprises a first wall having m parallel channels across a length of the first wall and a second wall having n parallel channels across a length of the second wall. In some embodiments, n is at least equal to m. Each parallel channel is equal to a diameter of a head of a drive mounting screw. The first wall comprises at least one bridge positioned across each m parallel channel and at least one clamp spring integrally coupled to a top of each m parallel channel. The second wall also comprises at least one bridge positioned across each n parallel channel. Each end of the m parallel channel extends at an inwards slant toward a center of the first wall. The inwards slant terminates at a circular area around configured in a dome shape with a flat top.

64 Claims, 6 Drawing Sheets

U.S. PATENT DOCUMENTS

| | | | |
|---|---|---|---|
| 7,035,099 B2* | 4/2006 | Wu | 361/679.33 |
| 7,036,783 B2 | 5/2006 | Chen et al. | |
| 7,075,783 B2 | 7/2006 | Jeong et al. | |
| 7,079,380 B2 | 7/2006 | Wubs | |
| 7,102,885 B2 | 9/2006 | Chen et al. | |
| 7,130,187 B1* | 10/2006 | Sun | 361/679.34 |
| 7,142,419 B2 | 11/2006 | Cochrane | 361/685 |
| 7,187,541 B2 | 3/2007 | Franke et al. | 361/685 |
| 7,218,512 B2 | 5/2007 | Han | |
| 7,267,313 B2 | 9/2007 | Krzoska et al. | |
| 7,274,560 B2 | 9/2007 | Jeong et al. | |
| 7,298,624 B2 | 11/2007 | Boswell | |
| 7,301,762 B2 | 11/2007 | Han | |
| 7,304,837 B2 | 12/2007 | Lo et al. | |
| 7,352,569 B2 | 4/2008 | Muenzer et al. | |
| 7,379,294 B2 | 5/2008 | Chen | |
| 7,450,375 B2 | 11/2008 | Xu | |
| 7,463,490 B2 | 12/2008 | Kim et al. | |
| 7,483,268 B1 | 1/2009 | King et al. | |
| 7,486,509 B2 | 2/2009 | Kim et al. | |
| 7,545,629 B1 | 6/2009 | Bauer, Jr. et al. | |
| 7,558,054 B1 | 7/2009 | Prest et al. | |
| 7,609,509 B2 | 10/2009 | Wu et al. | |
| 2002/0044416 A1 | 4/2002 | Harmon, III et al. | |
| 2002/0044418 A1 | 4/2002 | Shih | |
| 2002/0067592 A1 | 6/2002 | Horiuchi et al. | |
| 2003/0046849 A1 | 3/2003 | Lin | |
| 2003/0222555 A1* | 12/2003 | Mansueto | 312/330.1 |
| 2004/0032711 A1 | 2/2004 | Kaczeus, Sr. et al. | |
| 2004/0052192 A1 | 3/2004 | Chen | |
| 2004/0075978 A1* | 4/2004 | Chen et al. | 361/685 |
| 2004/0105229 A1 | 6/2004 | Wang et al. | |
| 2005/0040306 A1* | 2/2005 | Chen et al. | 248/298.1 |
| 2005/0087504 A1* | 4/2005 | Wu | 211/26 |
| 2005/0094367 A1 | 5/2005 | Franke et al. | |
| 2005/0099767 A1 | 5/2005 | Wu | |
| 2005/0103729 A1* | 5/2005 | Chen et al. | 211/26 |
| 2005/0237709 A1 | 10/2005 | Huang | |
| 2006/0023416 A1 | 2/2006 | Chen | |
| 2006/0158860 A1 | 7/2006 | Green et al. | |
| 2008/0019084 A1 | 1/2008 | Lee et al. | |
| 2008/0037212 A1 | 2/2008 | Wang | |
| 2008/0101006 A1 | 5/2008 | Tsorng et al. | |
| 2008/0137281 A1 | 6/2008 | Chen et al. | |
| 2008/0158810 A1 | 7/2008 | Liu et al. | |
| 2008/0165487 A1 | 7/2008 | Tsorng et al. | |
| 2008/0291619 A1 | 11/2008 | Fan et al. | |
| 2009/0279244 A1 | 11/2009 | Crippen et al. | |
| 2011/0128696 A1 | 6/2011 | Weng | |

OTHER PUBLICATIONS

Office action dated Jan. 6, 2010, U.S. Appl No. 12/124,301, filed May 21, 2008, applicants Cheng-Yuan Fan et al., 12 pages.

Office action dated Jun. 17, 2010. U.S. Appl. No. 12/134,301, filed May 21, 2008, applicants Cheng-Yuan Fan et al., 11 pages.

Application as filed on May 21, 2008, entitled "Computer Drive Cage with Integrated Biasing Elements", 25 pages, and 4 sheets of drawings.

* cited by examiner

US 8,061,535 B2

COMBINATION DEVICES CLAMP SPRING DESIGNED WITH DEVICES CAGE

CROSS REFERENCE TO RELATED APPLICATIONS

The application claims priority of U.S. provisional application, Ser. No. 60/921,220, filed Mar. 29, 2007, and entitled "Primary Only Constant Voltage/Constant Current (CVCC) Control in Quasi Resonant Converter." This application incorporates U.S. provisional application, Ser. No. 60/921,220, in its entirety by reference.

FIELD OF THE INVENTION

The present invention relates to device clamps. More particularly, the present invention relates to the combination devices clamp spring designed with a devices cage.

BACKGROUND OF THE INVENTION

An m-unit cage is used to hold together m drives such as optical disk drives (ODDs), floppy disk drives (FDDs), hard disk drives (HDDs), and other drives. Separate securing plates and a plurality of screws are used to fasten the drives to the m-unit cage. For example, FIGS. 1A-1B illustrate a three-unit cage 100 for holding together two ODDs 105 and one FDD 110. The two ODDs 105 are positioned above the FDD 110. The three-unit cage 100 is built using an ODD securing plate 115 and a FDD securing plate 120, as illustrated in FIGS. 1C-1D, respectively. Both the ODD securing plate 115 and the FDD securing plate 120 are typically formed in a single stamping operation on sheet metal and are separate from the three-unit cage 100. As illustrated in FIG. 1C, the ODD securing plate 115 comprises a ledge 125 along a top, a pair of supports 130 located at bottom opposite ends, and two pairs of contact springs 140. A first pair of contact springs 140 is located on a top surface of the ODD securing plate 115 near the ledge 125. A second pair of contact springs 140 is located at the bottom of the ODD securing plate 115. Both pairs of contact springs 140 depress against ODD screws that are attached to the ODD. As illustrated in FIG. 1D, the FDD securing plate 120 comprises a bar 145 and a pair of contact springs 140' located at a bottom of the bar 145. The pair of contact springs 140' depresses against FDD screws that are attached to the FDD. The ODD securing plate 115 and the FDD securing plate 120 may have additional holes to attach the plates 115, 120 to the three-unit cage 100 and/or other accessories by using additional screws.

FIG. 2A illustrates a one-unit cage 200 for holding a HDD 205. The one-unit cage 200 is built using a HDD securing plate 210, as illustrated in FIG. 2B. The HDD securing plate 210 is typically formed in a single stamping operation on sheet metal and is separate from the one-unit cage 200. As illustrated in FIG. 2B, the HDD securing plate 210 comprises a bar 215, two ledges 220 located at a top opposite ends of the bar 215, and a pair of contact springs 225 located at a bottom of the bar 215. The pair of contact springs 225 depresses against HDD screws that are attached to the HDD. The HDD securing plate 210 may have additional holes to attach the plate 210 to the one-unit cage 200 and/or other accessories by using additional screws.

Prior art cages and securing plates suffer from a number of shortcomings. For example, contact springs of the securing plates do not provide enough clamping force or friction to prevent drives within a cage from vibrating. As such, when the drives vibrate within the cage, the cage rattles, creating disturbing and often loud noises. Typically, the clamping force exerted by one contact spring against a device is 0.85 kgf. In addition, since the securing plates are separate components from the cage, use of the securing plates is an extra cost. Furthermore, the securing plates can be lost or misplaced.

The present invention addresses at least these limitations in the prior art.

SUMMARY OF THE INVENTION

Embodiments of the present invention are to provide a combination devices clamp spring designed with a devices cage. In one aspect, a devices cage for coupling devices comprises a first panel having m parallel channels across a length of the first panel, a plurality of bridges, and a plurality of clamp springs integrally coupled to a top of each m parallel channel. Preferably, a width of each m parallel channel is equal to a diameter of a head of a drive mounting screw. Typically, the m parallel channels are equally spaced apart. Each end of a channel extends at an inwards slant toward a center of the first panel. The inwards slant terminates at a center of a circular area, which is configured in a dome shape with a flat top. Preferably, the circular area controls dispersion of force. A first portion of the plurality of bridges is positioned across the m parallel channels. Preferably, the first portion of the plurality of bridges is configured to maintain rigidity of the first panel. Typically, the first portion of the plurality of bridges protrudes outwards away from the first panel. Typically, each of the plurality of clamp springs comprises a tongue and a clamp. A first part of the tongue extends outwards away from the first panel and a second part of the tongue parallels the first panel. The second part of the tongue is projected and positioned over a portion of a channel. The clamp is also projected and positioned over a portion of a channel. The clamp comprises an angled end and a flat end. The flat end parallels the first panel and an angled end angles away from the first panel. The flat end positions over the drive mounting screw. In some embodiments, the clamp has a clamping force of 1.5 kgf. Preferably, the clamping force is configured to prevent a device from vibrating. The clamping force is also configured to limit rattling noises of the devices cage. As such, the plurality of clamp springs has a friction damper characteristic. In some embodiments, the devices cage further comprises a second panel having n parallel channels across a length of the second panel and a second portion of the plurality of bridges positioned across each n parallel channels. Preferably, a width of each of the n parallel channels is equal to the diameter of the head of the drive mounting screw. Typically, the n parallel channels are equally spaced apart. The second portion of the plurality of bridges is configured to maintain rigidity of the second panel. Typically, the second portion of the plurality of bridges protrudes outwards away from the second panel. In some embodiments, n is at least equal to m. In other embodiments, the devices cage further comprises a bottom panel. Typically, the bottom panel is coupled to the first panel and the second panel.

In another aspect, a devices cage comprises a first wall having m parallel channels across a length of the first wall and a second wall having n parallel channels across a length of the second wall, wherein n is at least equal to m. In some embodiments, the first wall comprises at least one bridge positioned across each m parallel channel, and at least one clamp spring integrally coupled to a top of each m parallel channel. A width of each m parallel channel is equal to a diameter of a head of a drive mounting screw. The m parallel channels are equally spaced apart. Each end of a channel extends at an inwards slant toward a center of the first wall. The inwards slant terminates at a center of a circular area, which is configured in a dome shape with a flat top. Preferably, the circular area controls dispersion of force. The at least one bridge is configured to maintain rigidity of the first wall. The at least one bridge protrudes outwards away from the first wall. Typically, the at least one clamp spring comprises a tongue and a clamp. A first part of the tongue extends outwards away from the first wall and a second part of the tongue parallels the first wall. The second part of the tongue is projected and positioned over a portion of a channel. The clamp is also projected and positioned over a portion of a channel. The clamp comprises an angled end and a flat end. The flat end parallels the first wall and an angled end angles away from the first wall. Typically, the flat end positions over the mounting screw. In some embodiments, the clamp has a clamping force of 1.5 kgf. The clamping force is configured to prevent a device from vibrating. The clamping force is also configured to limit rattling noises of the devices cage. The at least one clamp spring has a friction damper characteristic. In other embodiments, the second wall comprises at least one bridge positioned across each m parallel channel. A width of each n parallel channel is equal to the diameter of the head of the drive mounting screw. The n parallel channels are equally spaced apart. The at least one bridge is configured to maintain rigidity of the second wall. The at least one bridge protrudes outwards away from the second wall.

In a further aspect, a wall of a chassis comprises at least one elongated opening across a length of the wall and at least one bridge positioned across the at least one elongated opening. In some embodiments, each end of the at least one elongated opening extends at an inwards slant toward a center of the wall. The inwards slant terminates at a circular area around, which is configured in a dome shape with a flat top. Typically, the circular area controls dispersion of force. Preferably, the at least one bridge is configured to maintain rigidity of the wall. The at least one bridge protrudes outwards away from the wall. In other embodiments, the wall further comprises a plurality of clamp springs integrally coupled to a top of the at least one elongated opening. Each of the plurality of one clamp springs comprises a tongue and a clamp. A first part of the tongue extends outwards away from the wall and a second part of the tongue parallels the wall. The second part of the tongue is projected and positioned over a portion of the at least one elongated opening. The clamp is also projected and positioned over a portion of the at least one elongated opening. The clamp comprises an angled end and a flat end. The flat end parallels the wall and an angled end angles away from the wall. The flat end positions over a drive mounting screw. In some embodiments, the clamp has a clamping force of 1.5 kgf. Preferably, the clamping force is configured to prevent a device from vibrating. The clamping force is configured to limit rattling noises of the chassis. As such, the plurality of clamp springs has a friction damper characteristic.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

A traditional m-unit cage for holding together m drives within the m-unit cage includes using separate components, specifically securing plates, to prevent the drives from vibrating and thus rattling the cage. Unlike the traditional m-unit cage, embodiments of the present invention are to provide a combination devices clamp spring designed with a devices cage to hold together the m drives within the devices cage. Accordingly, the securing plates are no longer necessary and/or used to prevent the m devices within the devices cage from vibrating. Preferably, the m drives in the devices cage include any combination of one or more optical disk drives (ODDs), one or more floppy disk drives (FDDs), one or more hard disk drives (HDDs), and/or other drives.

Figure 3A:
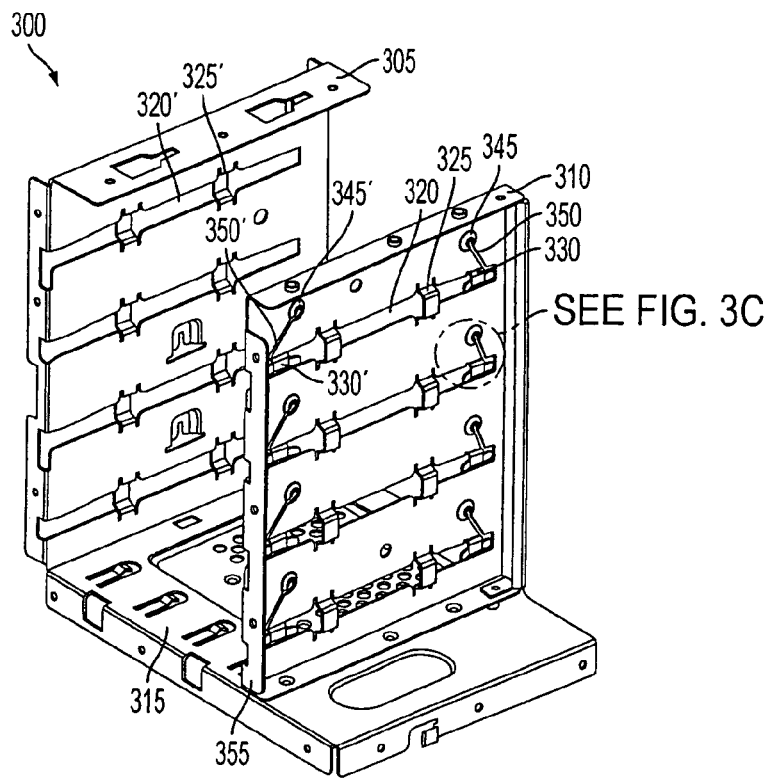
FIGS. 3A-3B illustrate an isometric side view of a devices cage having clamp springs in accordance with the present invention.
Figure 3B:
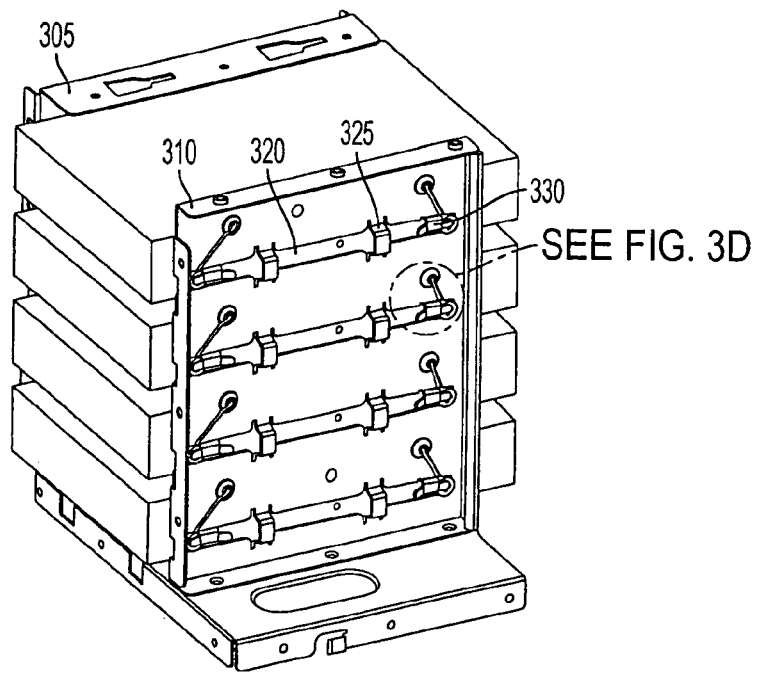

FIGS. 3A-3B illustrate an isometric side view of the devices cage 300 having a plurality of clamp springs 330 in accordance with the present invention. Preferably, the plurality of clamp springs 330 is integrated with the devices cage 300. FIG. 3A illustrates an isometric side view of the devices cage 300 empty of drives FIG. 3B illustrates an isometric side view of the devices cage 300 full of drives, such that each of the drives is positioned in an appropriate slot. Although the devices cage 300 illustrated in FIGS. 3A-3B is able to hold together up to four drives, it is understood that the devices cage 300 is not limited to the configuration shown and is for only exemplary purposes. Other devices cage holding together more than or less than four drives are contemplated.

Typically, the devices cage 300 comprises a left panel 305 and a right panel 310. The left panel 305 and the right panel 310 are perpendicularly coupled to a bottom panel 315. In some embodiments, the left panel 305 is positioned and coupled to an edge on a top surface of the bottom panel 315, while the right panel 310 is positioned and coupled to a portion of the top surface of the bottom panel 315. A distance equivalent to a width of a drive separates the left panel 305 and the right panel 310. Preferably, the left panel 305 and the right panel 310 are removable separate pieces and are coupled to the bottom panel 315 using rivets, screws, and/or other securing means. Alternatively, the left panel 305, right panel 310 and the bottom panel 315 are integrally coupled.

The right panel 310 has a first surface facing in (e.g. facing the left panel 305) and a second surface facing out. In some embodiments, the right panel 310 comprises m elongated rectangular openings or channels 320 across a length of the right panel 310, as illustrated in FIG. 3A. Typically, the m elongated rectangular openings 320 are parallel and are equally spaced apart. Each of the m elongated rectangular openings 320 corresponds to a slot wherein a device is able to be positioned within. Specifically, each elongated rectangular opening 320 allows a drive to insert into the devices cage 300. Preferably, a width of an elongated rectangular opening 320 is equal to a diameter of a head of a drive mounting screw that is on the drive. Typically, the right panel 310 comprises two bridges 325 positioned across each of the elongated rectangular openings 320. The bridges 325 protrude outwards away from the second surface of the right panel 310. Opposite ends of the bridges 325 are integrally coupled to the right panel 310. Typically, the bridges 325 are for structural purposes. Specifically, the bridges 325 are configured to maintain rigidity of the right panel 310. In some embodiments, only one bridge 325 is positioned across each of the elongated rectangular openings 320. Alternatively, more than two bridges 325 are positioned across each of the elongated rectangular openings 320. In other embodiments, each bridge 325 integrally coupled to the right panel 310 is aligned vertically and horizontally relative to the other bridges 325. Alternatively, each bridge 325 integrally coupled to the right panel 310 is positioned irrespective of where the other bridges 325 are positioned.

Figure 3C:
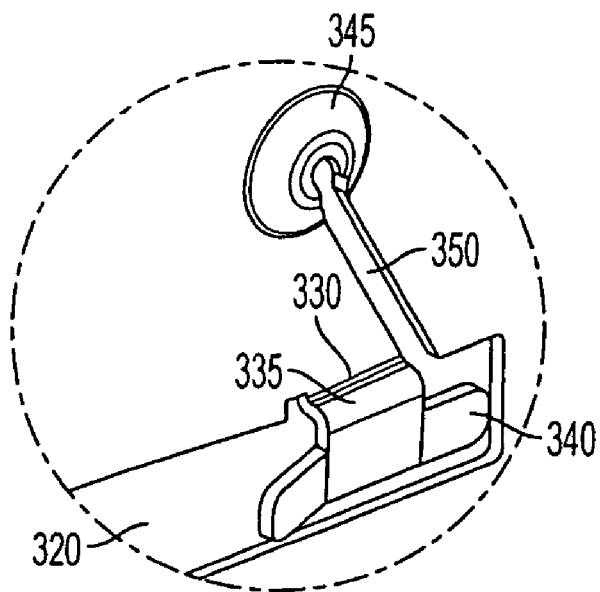
FIGS. 3C-3D illustrates a right end of an elongated rectangular opening in accordance with the present invention.

FIG. 3C illustrates a right end of an elongated rectangular opening 320 in accordance with the present invention. The right end of the elongated rectangular opening 320 extends upwards at an inwards slant toward a center of the right panel 310. The slant opening 350 is typically narrower than the elongated rectangular opening 320. A circular area 345 around an end of the slant opening 350 is typically in a dome shape with a flat top. Preferably, the end of the slant opening 350 terminates at the flat top. Typically, the circular area 345 controls dispersion of force.

As illustrated in FIG. 3C, a clamp spring 330 is integrally coupled to a top of the right end of the elongated rectangular opening 320, adjacent to a beginning of the slant opening 350. In some embodiments, the clamp spring 330 comprises a protruding tongue 335 and a clamp 340. A first part of the protruding tongue 335 extends outwards away from the second surface of the right panel 310. A second part of the protruding tongue 335 is substantially parallel with the second surface of the right panel 310. The second part of the protruding tongue 335 is typically projected and positioned over a portion of the opening 320. Preferably, the clamp 340 comprises an angled end and a flat end. Typically, the flat end is substantially parallel with the second surface of the right panel 310, and the angled end is angled away from the second surface of the right panel 310. The clamp 340 is also typically projected and positioned over a portion of the opening 320.

Although a left end of the elongated rectangular opening 320 is not illustrated, the left end is similarly configured as the right end of the elongated rectangular opening 320. Specifically, the left end of the elongated rectangular opening 320 extends upwards at an inwards slant toward the center of the right panel 310. The slant opening 350' is typically narrower than the elongated opening 320. A circular area 345' around an end of the slant opening 350' is typically in a dome shape with a flap top. Preferably, the end of the slant opening 350' terminates at the flat top. The left end, however, of the elongated rectangular opening 320 also extends to a left folded side 355 of the right panel 310, as illustrated in FIG. 3A, to allow the device to slide into the slot. In some embodiments, every other elongated rectangular opening 320 further extends down an adjacent edge of the folded side 355. The extensions are for structural purposes. FIG. 3A illustrates a first and a third elongated rectangular openings 320 extending down the adjacent edge of the folded side 355. In addition, a clamp spring 330' is integrally coupled to a top of the left end of the elongated rectangular opening 320. The clamp spring 330' is similarly configured as the clamp spring 330. In some embodiments, the angled ends of the clamp springs 330, 330' face each other.

Typically, the left panel 305 comprises m elongated rectangular openings or channels 320' across a length of the left panel 305, as illustrated in FIG. 3A. Typically, the m elongated rectangular openings 320' are parallel and are equally spaced apart. One end of each of the m elongated rectangular openings 320' extends to a folded side of the left panel 305 to allow the device to slide into the slot. Typically, the left panel 305 comprises two bridges 325' positioned across each elongated rectangular opening 320'. The bridges 325' protrude outwards away from the left panel 305. Opposite ends of the bridges 325' are integrally coupled to the left panel 305. The bridges 325' are configured to maintain rigidity of the left panel 305. In some embodiments, only one bridge 325' is positioned across each elongated rectangular opening 320'. Alternatively, more than two bridges 325' are positioned across each elongated rectangular opening 320'. In other embodiments, a bridge 325', coupled to the left panel 305, is aligned vertically and horizontally relative to other bridges 325'. Alternatively, the bridge 325' integrally coupled to the left panel 305 is positioned irrespective of where the other bridges 325 are positioned. Yet, in other embodiments, each of the m elongated rectangular openings 320' on the left panel 305 is aligned with a corresponding elongated rectangular opening 320 on the right panel 310.

Figure 3D:
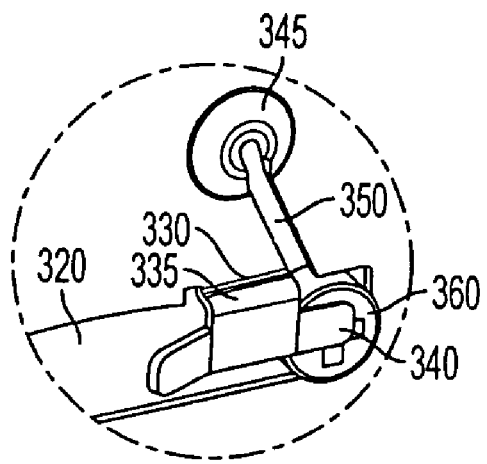

FIG. 3D illustrates the right end of an elongated rectangular opening 320 in accordance with the present invention when the device is within the devices cage 300. Typically, the device has a plurality of screws 360 on one or more sides of the device. Preferably, when the device is inserted within the devices cage 300, the elongated rectangular opening 320 align with a portion of the plurality of screws 360. Preferably, the flat end of the clamp 340 is positioned over a screw 360 thereby providing clamping force to prevent the device from vibrating. In some embodiments, the clamping force exerted by the flat end of the clamp 340 is 1.5 kgf. It is well known in the art that the drive vibrates when the drive in use. As such, an objective of the present invention is to clamp the drive well in a vibration environment, thereby limiting rattling noises of the devices cage 300. In other embodiments, the clamp spring 330 has a friction damper characteristic. Typically, friction is used to prevent the drive from slipping out.

Figure 1B:
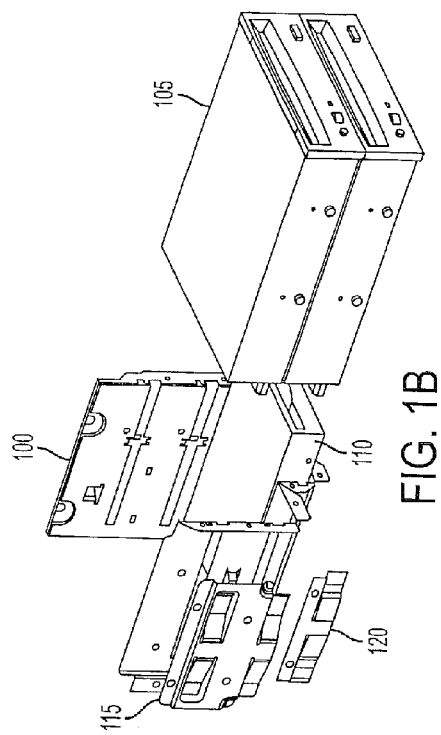
FIGS. 1A-1B illustrate an isometric side view of a three-unit cage with one ODD securing plate and one FDD securing date.
Figure 1D:
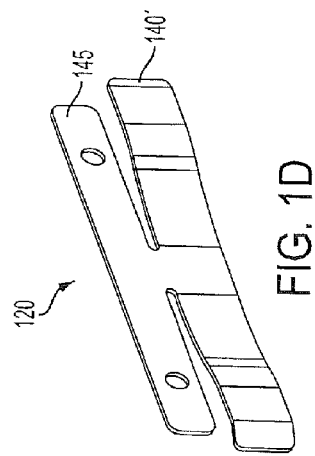
FIG. 1D illustrates an isometric side view of the FDD securing plate.
Figure 1A:
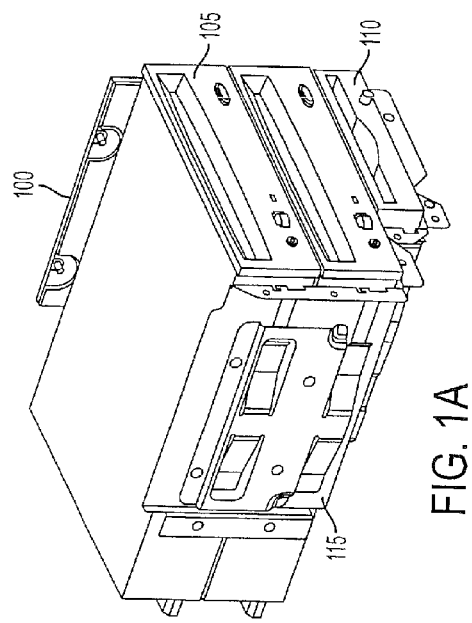
Figure 1C:
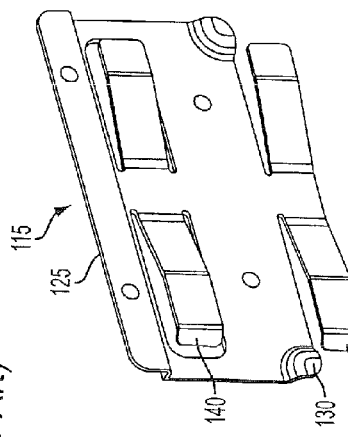
FIG. 1C illustrates an isometric side view of the ODD securing plate.
Figure 2C:
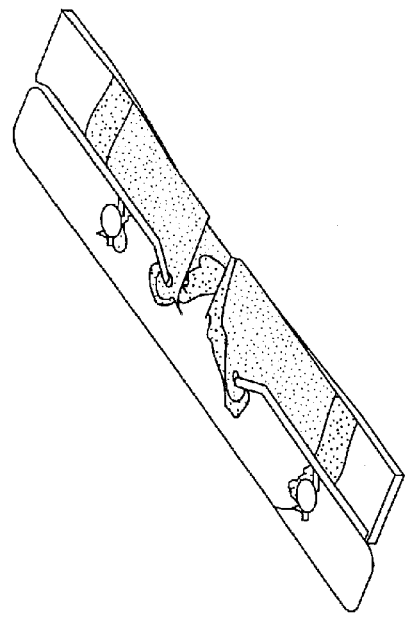
FIG. 2C illustrates a graphical representation of a stress analysis of the HDD securing plate.
Figure 2B:
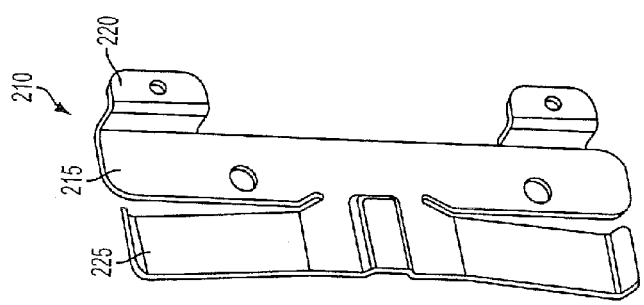
FIG. 2B illustrates an isometric side view of the HDD securing plate.
Figure 2A:
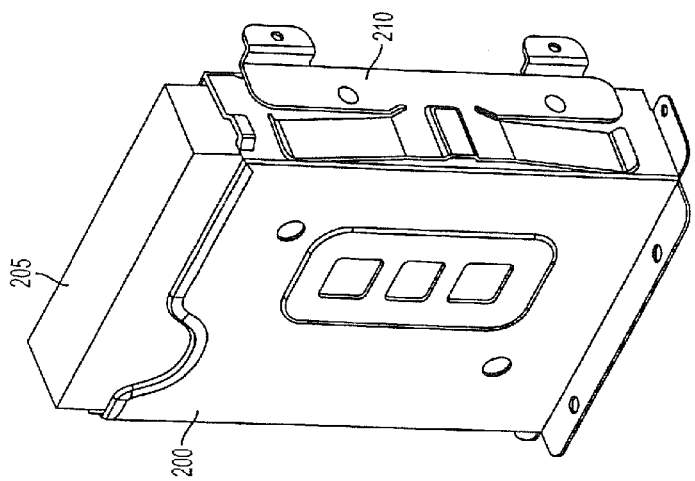
FIG. 2A illustrates an isometric side view of a two-unit cage with one HDD securing plate.
Figure 3E:
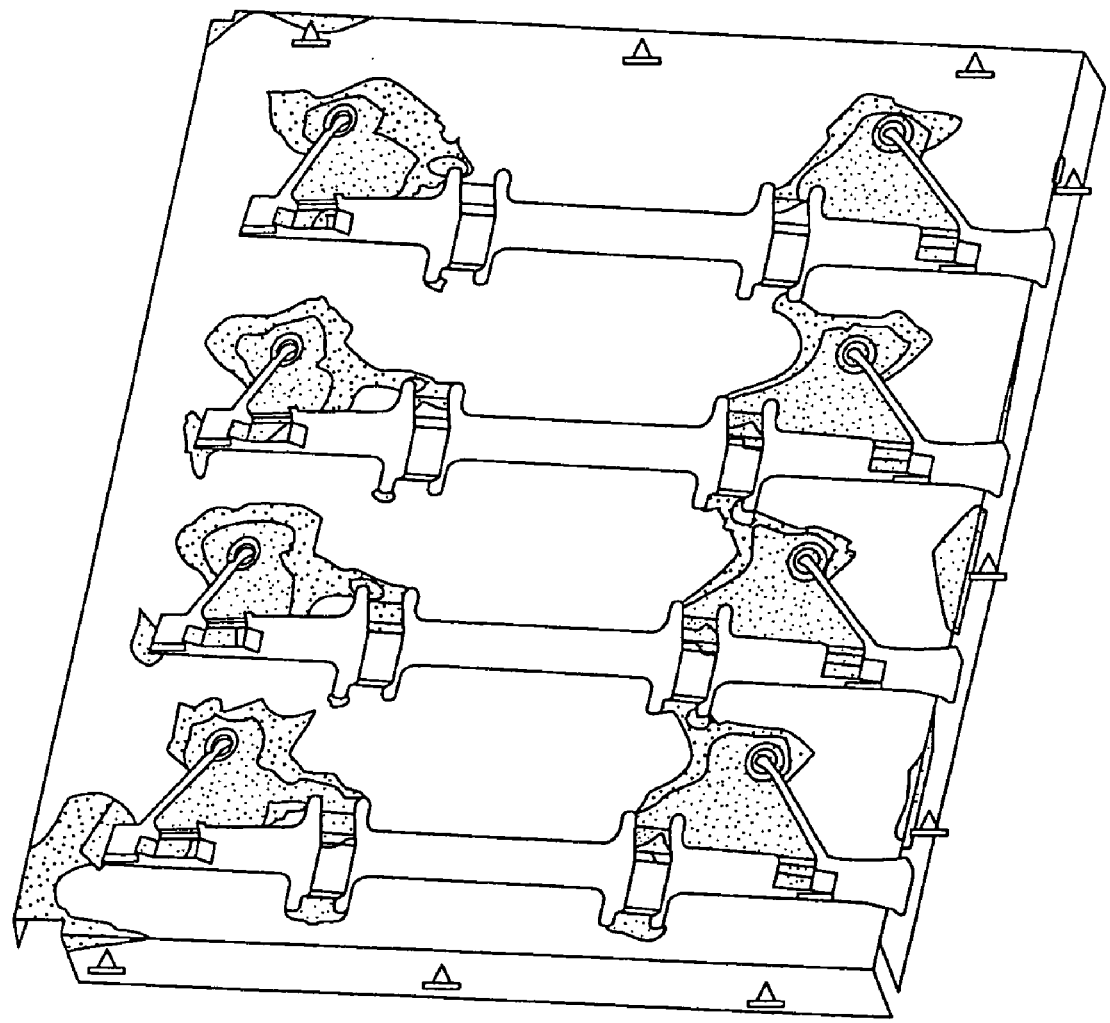
FIG. 3E illustrates a graphical representation of a stress analysis of a first surface of a wall of the devices cage in accordance with the present invention.

Fatigue is a progressive and localized structural damage that occurs when a material is subjected to cyclic loading. Fatigue life cycles are related to stress. A low fatigue life cycle involves a short life and significant amounts of deformation in the material. A high fatigue life cycle involves a long life and stresses and strains largely confined to a region. Stress analysis for the HDD securing plate 210 is illustrated in FIG. 2C, and stress analysis for the right panel 310 having a plurality of clamp springs 330 is illustrated in FIG. 3E. As illustrated in FIG. 2C and FIG. 3E, the HDD securing plate 210 and the right panel 310 are in a same level of stress. Accordingly, a fatigue life cycle of the right panel 310 having a plurality of clamp springs 330 is not worse than a fatigue life cycle of the HDD securing plate 210.

In addition to having a same or a better fatigue life cycle than the HDD securing plate 210, the clamp 340 of the present invention advantageously provides more clamping force than the contact spring 255 of the HDD securing plate 210. As mentioned above, the clamping force exerted on a screw of the HDD securing plate 210 is 0.85 kgf, while the clamping force exerted by the flat end of the clamp 340 of the present invention is 1.5 kgf. The greater the clamping force exerted, the stronger the securing of the device is, thereby preventing vibration of the device and rattling of the cage. As such, the clamp spring 330 prevents and/or limits vibration of the device.

Other Applications

Figure 4A:
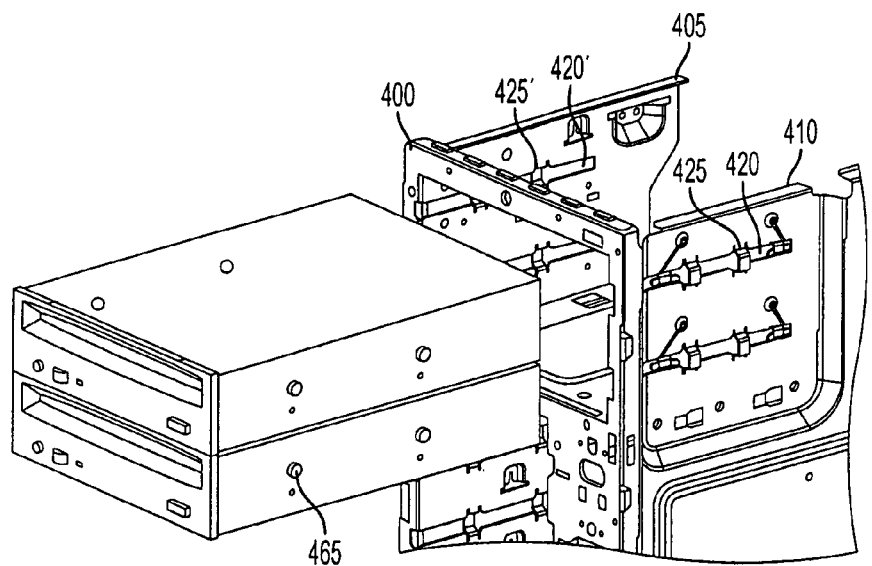
FIGS. 4A-4B illustrate an isometric side view of a system case of a desktop computer having clamp springs in accordance with the present invention.
Figure 4B:
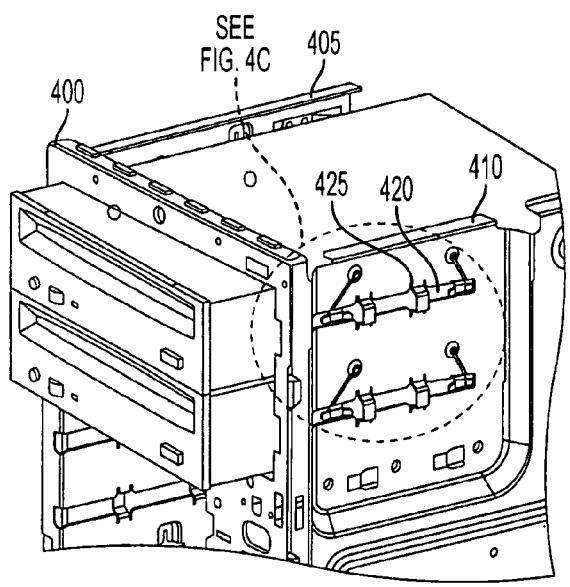

Another application of the present invention includes implementing elongated rectangular openings, bridges and clamps on a side panel of a system case of a desktop computer. FIGS. 4A-4B illustrate an isometric side view of the system case 400 of the desktop computer having a plurality of clamp springs 430 in accordance with the present invention. Preferably, the plurality of clamp springs 430 is integrated with the system case 400. For purposes of discussion, assume the system case 400 is able to hold together up to n drives.

In some embodiments, a side panel 410 having a plurality of clamp springs 430 is detachably coupled to the system case 400. Alternatively, the side panel 410 is integrally coupled to the system cage 400. The side panel 410 comprises n elongated rectangular openings or channels 420 across a length of the side panel 410. Typically, the n elongated rectangular openings 420 are parallel and are equally spaced apart. Each of the n elongated rectangular openings 420 corresponds to a slot wherein a device is able to be positioned within. Specifically, each elongated rectangular opening 320 allows a drive to insert into the system case 400. Preferably, a width of an elongated rectangular opening 420 is equal to a diameter of a head of a drive mounting screw that is on the drive.

Typically, the side panel 410 comprises two bridges 425 positioned across each of the elongated rectangular openings 420. The bridges 425 protrude outwards away from a surface of the side panel 410. Opposite ends of the bridges 425 are integrally coupled to the side panel 410. The bridges 425 are configured to maintain rigidity of the side panel 410. In some embodiments, only one bridge 425 is positioned across each of the elongated rectangular openings 420. Alternatively, more than two bridges 425 are positioned across each of the elongated rectangular openings 420. In other embodiments, each bridge 425 integrally coupled to the side panel 410 is aligned vertically and horizontally relative to the other bridges 425. Alternatively, each bridge 425 integrally coupled to the side panel 410 is positioned irrespective of where the other bridges 425 are positioned.

Figure 4C:
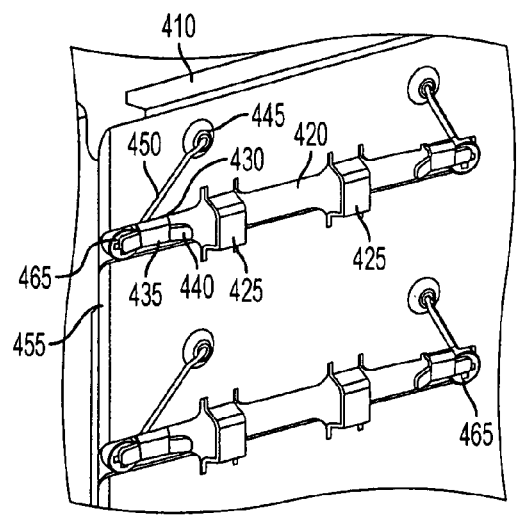
FIG. 4C illustrates an exploded view of a side panel in accordance with the present invention when the device is within the system case.

FIG. 4C illustrates an isometric side view of the side panel 410 in accordance with the present invention. Both ends of the elongated rectangular opening 420 extend upwards at an inwards slant toward a center of the side panel 410. The slant openings 450 are typically narrower than the elongated rectangular opening 420. A circular area 445 around an end of each slant opening 450 is typically in a dome shape with a flat top. Preferably, the end of the slant opening 450 terminates at the flat top. Similar to the devices cage 300, a left end of the elongated rectangular opening 420 also extends to a left folded side 455 of the side panel 410 to allow the device to slide into the slot.

As illustrated in FIG. 4C, clamp springs 430 are integrally coupled to a top of the elongated rectangular opening 420 at opposite ends, adjacent to a beginning of each slant opening 450. In some embodiments, a clamp spring 430 comprises a protruding tongue 435 and a clamp 440. A first part of the protruding tongue 435 extends outwards away from a surface of the side panel 410. A second part of the protruding tongue 435 is substantially parallel with the surface of the side panel 410. The second part of the protruding tongue 435 is typically projected and positioned over a portion of the opening 420. Preferably, the clamp 440 comprises an angled end and a flat end. Typically, the flat end is substantially parallel with the surface of the side panel 410, and the angled end is angled away from the surface of the side panel 410. The clamp 440 is also typically projected and positioned over a portion of the opening 420.

Typically, an opposite panel 405 comprises at least n elongated rectangular openings 420' across a length of the opposite panel 405, as illustrated in FIG. 4A. Typically, the at least n elongated rectangular openings 420' are parallel and are equally spaced apart. One end of each of the at least n elongated rectangular openings 420' extends to a folded side of the opposite panel 405 to allow the device to slide into the slot. Typically, the opposite panel 405 comprises two bridges 425' positioned across each elongated rectangular opening 420'. The bridges 425' protrude outwards away from the opposite panel 405. Opposite ends of the bridges 425' are integrally coupled to the opposite panel 405. The bridges 425' are configured to maintain rigidity of the opposite panel 405. In some embodiments, only one bridge 425' is positioned across each elongated rectangular opening 420'. Alternatively, more than two bridges 425' are positioned across each elongated rectangular opening 420'. In other embodiments, a bridge 425', coupled to the opposite panel 405, is aligned vertically and horizontally relative to other bridges 325'. Alternatively, the bridge 425' integrally coupled to the opposite panel 405 is positioned irrespective of where the other bridges 425' are positioned. Yet, in other embodiments, each of the n elongated rectangular openings 420 on the side panel 410 is aligned with a corresponding elongated rectangular opening 420' on the opposite panel 405.

FIG. 4C illustrates an exploded view of the side panel 410 in accordance with the present invention when the device is within the system case 400. Typically, the device has a plurality of screws 465 on one or more sides of the device. Preferably, when the device is inserted within the system case 400, a corresponding elongated rectangular opening 420 align with a portion of the plurality of screws 465. Preferably, the flat end of the clamp 440 is positioned over a screw 465 thereby providing clamping force to prevent the device from vibrating. In some embodiments, the clamping force exerted by the flat end of the clamp 440 is 1.5 kgf. In other embodiments, the clamp spring 430 has a friction damper characteristic. Typically, friction is used to prevent the drive from slipping out.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the combination devices clamp spring designed with devices cage will occur. Consequently, the claims should be broadly construed, consistent with the spirit and scope of the invention, and should not be limited to their exact, literal meaning.

We claim:

1. A devices cage for coupling devices comprising:
    a. a first panel having m parallel channels across a length of the first panel, wherein each end of each one of said m parallel channels extends at an inwards slant toward a line extending through a center of the first panel;

b. a first plurality of bridges positioned across the m parallel channels; and c. a plurality of clamp springs integrally coupled to a top of each m parallel channel, wherein each of the plurality of clamp springs comprises a tongue and a clamp.

2. The devices cage of claim 1 wherein each m parallel channel is sized and configured to receive a drive mounting screw.

3. The devices cage of claim 1 wherein the m parallel channels are equally spaced apart.

4. The devices cage of claim 1 wherein the inwards slant terminates at a center of a circular area configured in a dome shape with a flat top, wherein the circular area controls dispersion of force.

5. The devices cage of claim 1 wherein the first plurality of bridges is configured to maintain rigidity of the first panel.

6. The devices cage of claim 1 wherein the first plurality of bridges protrudes outwards away from the first panel.

7. The devices cage of claim 1 wherein a first part of the tongue extends outwards away from the first panel and a second part of the tongue parallels the first panel.

8. The devices cage of claim 7 wherein the second part of the tongue is projected and positioned over a portion of one of said m parallel channels.

9. The devices cage of claim 1 wherein the clamp comprises an angled end and a flat end.

10. The devices cage of claim 9 wherein the flat end parallels the first panel and the angled end angles away from the first panel, wherein the flat end is configured to position over a drive mounting screw.

11. The devices cage of claim 1 wherein the clamp has a clamping force of 1.5 kgf.

12. The devices cage of claim 11 wherein the clamping force is configured to prevent a device from vibrating, to limit rattling noises of the devices cage, or both.

13. The devices cage of claim 1 wherein the clamp is projected and positioned over a portion of one of said m parallel channels.

14. The devices cage of claim 1 wherein the plurality of clamp springs has a friction damper characteristic.

15. The devices cage of claim 1 further comprising:
a. a second panel having n parallel channels across a length of the second panel; and
b. a second plurality of bridges positioned across each n parallel channels.

16. The devices cage of claim 15 wherein each n parallel channel is sized and configured to receive a drive mounting screw.

17. The devices cage of claim 15 wherein the n parallel channels are equally spaced apart.

18. The devices cage of claim 15 wherein the second plurality of bridges is configured to maintain rigidity of the second panel.

19. The devices cage of claim 15 wherein the second plurality of bridges protrudes outwards away from the second panel.

20. The devices cage of claim 15 wherein the number of n channels is at least equal to the number of m channels.

21. The devices cage of claim 15 further comprising a bottom panel, wherein the bottom panel is coupled to the first panel and the second panel.

22. A devices cage comprising a first wall having m parallel channels across a length of the first wall, wherein each end of each m parallel channel intersects a secondary channel that extends at an inwards slant toward a line extending through a center of the first wall, and a second wall having n parallel channels across a length of the second wall, wherein the number of n is at least equal to the number of m channels, wherein the first wall comprises at least one clamp spring integrally coupled to a top of each m parallel channel, and wherein the at least one clamp spring comprises a tongue and a clamp.

23. The devices cage of claim 22 wherein the first wall comprises a at least one bridge positioned across each m parallel channel.

24. The devices cage of claim 22 wherein each m parallel channel is sized and configured to a drive mounting screw.

25. The devices cage of claim 22 wherein the m parallel channels are equally spaced apart.

26. The devices cage of claim 22 wherein the inwards slant terminates at a center of a circular area configured in a dome shape with a flat top, wherein the circular area controls dispersion of force.

27. The devices cage of claim 23 wherein the at least one bridge is configured to maintain rigidity of the first wall.

28. The devices cage of claim 23 wherein the at least one bridge protrudes outwards away from the first wall.

29. The devices cage of claim 22 wherein a first part of the tongue extends outwards away from the first wall and a second part of the tongue parallels the first wall.

30. The devices cage of claim 29 wherein the second part of the tongue is projected and positioned over a portion of one of said m parallel channels.

31. The devices cage of claim 22 wherein the clamp comprises an angled end and a flat end.

32. The devices cage of claim 31 wherein the flat end parallels the first wall and the angled end angles away from the first wall, wherein the flat end is configured to position over a mounting screw.

33. The devices cage of claim 22 wherein the clamp has a clamping force of 1.5 kgf.

34. The devices cage of claim 33 wherein the clamping force is configured to prevent a device from vibrating, to limit rattling noises of the devices cage, or both.

35. The devices cage of claim 22 wherein the clamp is projected and positioned over a portion of one of said m parallel channels.

36. The devices cage of claim 23 wherein the at least one clamp spring has a friction damper characteristic.

37. The devices cage of claim 22 wherein the second wall comprises at least one bridge positioned across each n parallel channel.

38. The devices cage of claim 22 wherein each n parallel channel is sized and configured to receive a drive mounting screw.

39. The devices cage of claim 22 wherein the n parallel channels are equally spaced apart.

40. The devices cage of claim 37 wherein the at least one bridge is configured to maintain rigidity of the second wall.

41. The devices cage of claim 37 wherein the at least one bridge protrudes outwards away from the second wall.

42. A wall of a chassis comprising:
a. at least one elongated opening across a length of the wall, wherein each end of the at least one elongated opening intersects a secondary opening that extends at an inwards slant toward a line extending through a center of the wall;
b. at least one bridge positioned across the at least one elongated opening; and
c. a plurality of clamp springs integrally coupled to a top of the at least one elongated opening, wherein each of the plurality of clamp springs comprises a tongue and a clamp.

43. The wall of claim 42 wherein the inwards slant terminates at a circular area around configured in a dome shape with a flat top, wherein the circular area controls dispersion of force.

44. The wall of claim 42 wherein the at least one bridge is configured to maintain rigidity of the wall.

45. The wall of claim 42 wherein the at least one bridge protrudes outwards away from the wall.

46. The wall of claim 42 wherein a first part of the tongue extends outwards away from the wall and a second part of the tongue parallels the wall.

47. The wall of claim 46 wherein the second part of the tongue is projected and positioned over a portion of the at least one elongated opening.

48. The wall of claim 46 wherein the clamp comprises an angled end and a flat end.

49. The wall of claim 48 wherein the flat end parallels the wall and the angled end angles away from the wall, wherein the flat end is configured to position over a drive mounting screw.

50. The wall of claim 42 wherein the clamp has a clamping force of 1.5 kgf.

51. The wall of claim 50 wherein the clamping force is configured to prevent a device from vibrating, to limit rattling noises of the chassis, or both.

52. The wall of claim 42 wherein the clamp is projected and positioned over a portion of the at least one elongated opening.

53. The wall of claim 42 wherein the plurality of clamp springs has a friction damper characteristic.

54. A computer drive assembly comprising a computer drive and a computer drive support comprising:
   a. a first side support panel that is an integrally-formed structure, that is interconnectable with a computer chassis, and that slidably receives said computer drive, wherein said first side support panel comprises:
      1. a computer drive installation slot; and
      first and second contacts that are aligned with said computer drive installation slot, that are spaced along said computer drive installation slot, and that engage the computer chassis when installed in said computer drive support, wherein first and second fastener heads are disposed on a first sidewall of said computer drive, wherein said first and second contacts engage said first and second fastener heads, respectively, when said computer drive is installed within said computer drive support, and wherein the first and second contacts each comprise a clamp spring comprising a tongue and a clamp; and
   b. a second side support panel that is spaced from said first side support panel.

55. The computer drive assembly of claim 54 wherein said first side support panel further comprises first and second ends, wherein the computer drive moves past said first end and then toward said second end when being installed in said computer drive support, and wherein said computer drive installation slot extends from said first end toward said second end.

56. The computer drive assembly of claim 54 wherein said first and second contacts are disposed out of said computer drive installation slot in a direction that is away from a space between said first and second side panel support panels.

57. The computer drive assembly of claim 54 wherein said computer drive installation slot comprises first and second slot edges that extend along a length dimension of said computer drive installation slot, wherein said first contact is interconnected with one of said first and second slot edges, and wherein said second contact is interconnected with one of said first and second slot edges.

58. The computer drive assembly of claim 57 wherein said first side support panel further comprises at least one rib that extends between said first and second slot edges outside of said computer drive installation slot.

59. The computer drive assembly of claim 54 wherein said first side support panel further comprises first and second slots that each intersect with said computer drive installation slot in proximity to said first and second contacts, respectively, wherein said computer drive support further comprises first and second biasing elements, wherein said first biasing element comprises said first contact and a first flexible section that is collectively defined by said first slot and said computer drive installation slot, wherein said first contact moves along with said first flexible section as the computer drive is installed in said computer drive support, wherein said second biasing element comprises said second contact and a second flexible section that is collectively defined by said second slot and said computer drive installation slot, and wherein said second contact moves along with second flexible section as the computer drive is installed in said computer drive support.

60. A computer drive assembly of claim 54, wherein each end of the computer drive installation slot extends an inwards slant toward a line extending through a center of the first side support panel.

61. A computer drive support for removably integrating a computer drive with a computer chassis, comprising:
   a. a first side support panel that is an integrally-formed structure, that is interconnectable with a computer chassis, and that slidably receives a computer drive, wherein said first side support panel comprises:
      1. a computer drive installation slot;
      2. a first slot that intersects with said computer drive installation slot, wherein said first slot extends from a first anchor to said computer drive installation slot, wherein said first anchor comprises a first indentation on said first side support panel;
      3. a first flexible section collectively defined by said computer drive installation slot and said first slot; and
      4. a first contact that is interconnected with said first flexible section and aligned with said computer drive installation slot; and
   b. a second side support panel that is spaced from said first side support panel.

62. The computer drive support of claim 61 wherein said first side support panel further comprises first and second ends, wherein the computer drive moves past said first end and then toward said second end when being installed in said computer drive support, and wherein said computer drive installation slot extends from said first end toward said second end.

63. The computer drive support of claim 61 wherein said first slot extends from said computer drive installation slot at least generally toward a farthest end of said computer drive installation slot.

64. The computer drive support of claim 61 wherein said first contact is disposed out of said computer drive installation slot in a direction that is away a space between said first and second side support panels.

* * * * *

UNITED STATES PATENT AND TRADEMARK OFFICE
CERTIFICATE OF CORRECTION

PATENT NO.       : 8,061,535 B2
APPLICATION NO.  : 12/079690
DATED            : November 22, 2011
INVENTOR(S)      : Cheng-Yuan et al.

It is certified that error appears in the above-identified patent and that said Letters Patent is hereby corrected as shown below:

IN THE CLAIMS
In the Claims, in Claim 23 at column 10, line 37, please delete the word "a" between the words "comprises" and "at" so that the claim correctly reads:

-- 23. The devices cage of claim 22 wherein the first wall comprises at least one bridge positioned across each m parallel channel. --

In the Claims, in Claim 54, at column 11, line 38, please insert the word -- 2. -- before the words "first and second" so that the claim limitation correctly reads:

-- 2. first and second contacts that are aligned with said computer drive installation slot, that are spaced along said computer drive installation slot, and that engage the computer chassis when installed in said computer drive support, wherein first and second fastener heads are disposed on a first sidewall of said computer drive, wherein said first and second contacts engage said first and second fastener heads, respectively, when said computer drive is installed within said computer drive support, and wherein the first and second contacts each comprise a clamp spring comprising a tongue and a clamp; and --

Signed and Sealed this
Twelfth Day of June, 2012

David J. Kappos
*Director of the United States Patent and Trademark Office*